(12) United States Patent
Kuntimaddi

(10) Patent No.: US 12,453,906 B2
(45) Date of Patent: Oct. 28, 2025

(54) GOLF BALL AND METHOD OF MAKING SAME

(71) Applicant: Acushnet Company, Fairhaven, MA (US)

(72) Inventor: Manjari Kuntimaddi, Raynham, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 17/517,832

(22) Filed: Nov. 3, 2021

(65) Prior Publication Data
US 2023/0132906 A1    May 4, 2023

(51) Int. Cl.
*A63B 37/12* (2006.01)
*A63B 37/00* (2006.01)
*C08K 9/02* (2006.01)

(52) U.S. Cl.
CPC .... *A63B 37/00221* (2020.08); *A63B 37/0024* (2013.01); *A63B 37/0051* (2013.01); *A63B 37/0074* (2013.01); *C08K 9/02* (2013.01); *A63B 2209/00* (2013.01); *C08K 2201/011* (2013.01)

(58) Field of Classification Search
CPC .............................. A63B 37/0022; A63B 37/12
USPC ....................................................... 473/378
See application file for complete search history.

(56) References Cited

U.S. PATENT DOCUMENTS

| | | |
|---|---|---|
| 7,208,546 B2 | 4/2007 | Rajagopalan et al. |
| 9,650,520 B2 | 5/2017 | Luo et al. |
| 2005/0245690 A1* | 11/2005 | Rajagopalan .......... B82Y 30/00 473/378 |
| 2008/0000364 A1* | 1/2008 | Bevirt ................ A63B 24/0021 101/35 |
| 2010/0222159 A1* | 9/2010 | Okabe ....................... C09C 1/32 473/378 |
| 2015/0132494 A1* | 5/2015 | Luo ........................ C01G 31/02 549/208 |

OTHER PUBLICATIONS

Ali Vagar, Wonderful Engineering, New Vanadium Dioxide Coating Turns Existing Glass into Smart Glass, pp. 1-6, Sep. 25, 2019.
Mohammed Soltani & Anthony B. Kaye, Properties and Applications of Thermochronic Vanadium Dioxide Smart Coating, pp. 1-36, Dec. 2015.
E.E. Chain, Optical Properties of Vanadium Dioxide and Vanadium Pentoxide Thin Films, Pub Med, Jul. 1991.

* cited by examiner

*Primary Examiner* — Raeann Gorden

(57) ABSTRACT

Golf ball comprising a layer formed from a vanadium dioxide nano-particle composition; wherein the vanadium dioxide nano-particle composition comprises a polymer composition and one of a plurality of vanadium dioxide composite nano-particles, a vanadium dioxide composite nano-particle slurry, or a mixture of a polymer emulsion and the vanadium dioxide composite nano-particle slurry. Non-limiting examples of suitable polymer compositions include latexes, lacquers, enamels, acrylics, an epoxies, polyesters, urethane acrylates, polyester acrylates, alkyds, thermoset polyurethane compositions, thermoplastic polyurethane compositions, and/or ionomer compositions. The vanadium dioxide composite nano-particle slurry may be formed from a plurality of vanadium dioxide composite nano-particles that are dispersed throughout a dispersion medium. The polymer emulsion may comprise an aqueous dispersion or an emulsion of polymer resin.

3 Claims, No Drawings

GOLF BALL AND METHOD OF MAKING SAME

FIELD OF THE INVENTION

The field of the invention broadly comprises golf ball constructions incorporating compositions that exhibit both high visible light transmittance and excellent ultraviolet light screening without sacrificing durability and other desirable playing characteristics, and methods of making such golf balls.

BACKGROUND OF THE INVENTION

Today, both professional and amateur golfers alike use multi-piece, solid golf balls. A single or multi-layered core is encapsulated by at least one layer such as a single or multi-layered cover, and optionally one or more intermediate layers may be disposed there between to complete the golf ball construction.

Golf ball manufacturers pre-select the materials for each layer to target and impart desirable golf ball performance properties. Currently, a broad range of options are available for strategically incorporating and coordinating layers within each golf ball construction. In multi-layered golf balls, each of the core, intermediate layer and cover properties, such as hardness, compression, resilience, specific gravity, outer diameter, and thickness can be preselected and coordinated to target play characteristics such as spin, initial velocity and feel of the resulting golf ball.

Meanwhile, golf ball manufacturers seek to develop new golf ball constructions incorporating compositions that exhibit both high visible light transmittance and excellent ultraviolet light screening without sacrificing durability and other desirable playing characteristics.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY OF THE INVENTION

Accordingly, a golf ball of the invention comprises a layer formed from a vanadium dioxide nano-particle composition, the vanadium dioxide nano-particle composition comprising: a polymer composition; and one of: a plurality of vanadium dioxide composite nano-particles; a vanadium dioxide composite nano-particle slurry; or a mixture of a polymer emulsion and the vanadium dioxide composite nano-particle slurry.

In one embodiment, the vanadium dioxide nano-particle composition comprises the vanadium dioxide composite nano-particle slurry; wherein the vanadium dioxide composite nano-particle slurry comprises a dispersion medium and a plurality of vanadium dioxide composite nano-particles dispersed throughout the dispersion medium; wherein the dispersion medium comprises one or more solvent selected from deionized water, ethanol, propanol, isopropanol, ethyl acetate, toluene or butanone.

In another embodiment, the vanadium dioxide nano-particle composition comprises the mixture of the polymer emulsion and the vanadium dioxide composite nano-particle slurry; wherein the polymer emulsion is an aqueous dispersion or an emulsion of polymer resin.

In a particular embodiment, the polymer emulsion is the emulsion of polymer resin; wherein the polymer resin is selected from one or more of polyurethane resins, polyurea resins, polyurethane/polyurea resins, ionomer resins, polyester resins, silicone resins or epoxy resins.

In one embodiment, the golf ball comprises a core, a cover and a coating layer; wherein the coating layer is the layer formed from the vanadium dioxide nano-particle composition.

In one such embodiment, the polymer composition of the vanadium dioxide nano-particle composition is a latex, a lacquer, or an enamel.

In another such embodiment, the polymer composition of the vanadium dioxide nano-particle composition comprises one or more of an acrylic, an epoxy, a urethane, a polyester, a urethane acrylate, a polyester acrylate, or an alkyd.

In a different embodiment, the golf ball comprises a core and a cover; wherein the cover is the layer formed from the vanadium dioxide nano-particle composition.

In one embodiment, the polymer composition of the vanadium dioxide nano-particle composition comprises one or more of a thermoset polyurethane composition, a thermoplastic polyurethane composition, or an ionomer composition. In a specific embodiment, the vanadium dioxide nano-particle composition is castable.

The vanadium dioxide nano-particle composition may further comprise one or more additives selected from antioxidants, initiators, processing aids, stabilizers, surfactants, impact modifiers, softening agents, plasticizers, coalescing agents, wetting-assisting agents, thickening agents, levelling agents, waxes, adhesion promoters, fillers, fibers, flakes, plasticizers, chemical blowing and foaming agents, defoaming agents, optical brighteners, coloring agents, fluorescent agents, whitening agents, UV absorbers, light stabilizers, fragrance components, titanium dioxide or nano-scale materials.

In some embodiments, one or more vanadium dioxide nano-particle forms a core of a core-shell polymer; wherein a shell of the core-shell polymer comprises titanium dioxide.

In yet another embodiment, the golf ball comprises a core and a cover; wherein the core comprises the vanadium dioxide nano-particle composition. In specific such embodiment, the polymer composition is rubber-based.

In a particular embodiment, the vanadium dioxide nano-particle composition comprises the plurality of vanadium dioxide composite nano-particles; wherein each vanadium dioxide composite nano-particle has a particle size of 200 nm or less.

In a specific embodiment, the polymer composition is included in the vanadium dioxide nano-particle composition in an amount of 30 wt. % or greater, based on the total weight of the vanadium dioxide nano-particle composition.

The invention also relates to a method of making a golf ball comprising the steps of: providing a subassembly; and forming one or more layer about the subassembly; wherein one or more of the subassembly or the one or more layer is formed from a vanadium dioxide nano-particle composition; wherein the vanadium dioxide nano-particle composition comprises one of: a plurality of vanadium dioxide composite nano-particles; a vanadium dioxide composite nano-particle slurry; or a mixture of a polymer emulsion and the vanadium dioxide composite nano-particle slurry.

DETAILED DESCRIPTION OF THE INVENTION

A golf ball of the invention comprises a layer formed from a vanadium dioxide nano-particle composition, the vanadium dioxide nano-particle composition comprising: a polymer composition; and one of: a plurality of vanadium dioxide composite nano-particles; a vanadium dioxide composite nano-particle slurry; or a mixture of a polymer emulsion and the vanadium dioxide composite nano-particle slurry.

The term "vanadium dioxide composite nano-particles", as used herein, refers to vanadium dioxide composite nano-particles/powders created in accordance with the processes disclosed in U.S. Pat. No. 9,650,520 of Luo et al. ("Luo"), hereby incorporated herein in its entirety.

Each vanadium dioxide composite nano-particle has a chemical composition of $V_{1-x}M_xO_2$ and a surface that is grafted with organic modifying long-chain molecules, wherein M represents doping elements, and $0 \leq x \leq 0.5$, which improves the chemical stability and dispersibility of vanadium dioxide nano-particles.

The resulting vanadium dioxide composite nano-particles contain 0.1-50%, or 1-40%, or 1-30%, or 1-10% of organic modifying long-chain molecules.

Preferably, the length of the organic modifying long-chain molecules is 0.1 nm-100 nm. Organic surface modification of vanadium dioxide nano-particles may be accomplished using functionalized organic long chains such as long-chain alkyls, polyacrylic acid groups, polyvinyl alcohol groups, epoxy groups, long-chain alkylamino groups, halogenated long-chain alkyls, and carboxylated long-chain alkyls, etc.

The surfaces of the vanadium dioxide nano-particles are grafted and clad with organic modifiers to change the surface properties of the vanadium dioxide nano-particles so that the resulting vanadium dioxide composite nano-particle has an improved dispersibility in various solvents and can produce golf ball layers displaying excellent weatherability when exposed to ultraviolet light.

Preferably, the vanadium dioxide nano-particles used to produce the vanadium dioxide composite nano-particles are in rutile phase, with a phase transition temperature adjustable in a range of $-20$-$70°$ C. The portion of rutile phase vanadium dioxide may be as high as 80%, even up to 100%.

The doping elements M may be any one or any combination of transition metal elements with an atomic number from 21 to 30 near vanadium in the periodic table, tin and its nearby elements in the periodic table, and W, Mo, Ru, Nb, etc. The transition metal elements with atomic number from 21 to 30 near vanadium in the periodic table include Sc, Ti, Cr, Mn, Fe, Co, Ni, Cu and Zn, the tin and its nearby elements in the periodic table include In, Sb, Sn, Ga, Ge, Pb and Bi. The doping elements are preferably W, Mo, Bi, Sn, Fe, Zn, and Ti.

The size and morphology of vanadium dioxide nano-particles can be controlled by the above-mentioned doping elements, and the phase transition temperature of vanadium dioxide can also be regulated by the above-mentioned doping elements.

For example, each vanadium dioxide composite nano-particle may have a particle size of 200 nm or less. Herein, particle sizes of the vanadium dioxide composite nano-particles may be ascertained from a transmission electron microscopy (TEM) image of the vanadium dioxide nano-particles after their respective surfaces are organically modified.

The morphology of the vanadium dioxide nano-particles may be granule, nanorod, and/or snowflake nano-particles. The granular shapes may be various shapes such as nearly a sphere, ellipse, snowflake, cube, sheet, etc.

The vanadium dioxide nano-particles preferably have granular shapes and the aspect ratio of the granules may be 1:1-10:1, preferably 1:1-5:1, more preferably 1:1-2:1. The granule size may be 1 μm or less in at least one dimension, preferably 100 nm or less in at least one dimension, more preferably 100 nm or less in three dimensions, most preferably 70 nm or less in three dimensions.

Vanadium dioxide composite nano-particles may be formed by dispersing vanadium dioxide nano-particles into a dispersion medium to obtain a mixture A; adding dispersion-assisting agents and organic modifiers for forming organic modifying long-chain molecules on the surface of the vanadium dioxide nano-particles into the mixture A, stirring until fully, evenly mixed to obtain a mixture B; and then drying the mixture B to obtain the organically modified vanadium dioxide composite nano-particles.

With regard to preparing the vanadium dioxide composite nano-particles, specifically, 0.1-50 wt. % of the vanadium dioxide nano-particles and 50-99 wt. % of a dispersion medium are stirred at high speed to be dispersed and mixed, and ultrasonically dispersed to obtain a mixture, then dispersion-assisting agents and organic modifiers are added to the mixture, and the resulting mixture is stirred at a constant temperature in the range of 0-200° C., and dispersed by means of ultrasound, sanding, or ball-milling, etc. Then they are centrifugation precipitated and the precipitates are dried under a vacuum at a certain temperature to obtain organically modified vanadium dioxide composite powders. In the process of mixing the vanadium dioxide nano-particles and the dispersion medium, the weight ratio between them may be 1:1-1:20, preferably 1:1-1:10, more preferably 1:2-1:5.

As stated above, the vanadium dioxide nano-particles may be rutile phase vanadium dioxide nano-particle or doped rutile phase vanadium dioxide nano-particle. When preparing doped rutile phase vanadium dioxide nano-particles, before doping elements, the precursor ($V^{4+}$ ion aqueous solution) may be treated with alkaline reagents, so as to obtain vanadium dioxide nano-particles with a controllable size (1 μm or less in at least one dimension) and morphology (granular, with an aspect ratio of 10:1 or less).

The dispersion-assisting agents may be one or more agents selected from the group consisting of polyvinyl alcohol, polyvinylpyrrolidone, organically modified polysiloxane dipropylene glycol monomethyl ether solution, silicone surfactants, fluorosurfactants, and other known dispersion-assisting agents.

The organic modifiers may be stearic acid, polyacrylic acid, silane coupling agents, aluminate coupling agents, titanate coupling agents, etc., preferably silane coupling agents with macromolecular long chains.

By means of coupling agents, the surface of vanadium dioxide can be grafted with organic long-chain molecules, thereby greatly improving the chemical stability and dispersibility of the vanadium dioxide nano-particles.

The dispersion medium may be one or more inert solvents such as ethanol, isopropanol, chloroform, dimethylformamide, dimethyl sulfoxide, dichloroethane, acetone, etc.

The surface modification process by organic modifiers can effectively improve the dispersibility and chemical stability of vanadium dioxide ($VO_2$) nano-particles and doped vanadium dioxide nano-particles and produce golf ball materials that exhibit both high visible light transmittance and excellent ultraviolet light screening without sacrificing golf ball durability and other desirable golf ball playing characteristics.

In a specific embodiment, the vanadium dioxide nano-particle composition comprises the vanadium dioxide composite nano-particle slurry; wherein the vanadium dioxide composite nano-particle slurry comprises a dispersion medium and a plurality of vanadium dioxide composite nano-particles dispersed throughout the dispersion medium; wherein the dispersion medium comprises one or more solvent selected from deionized water, ethanol, propanol, isopropanol, ethyl acetate, toluene or butanone.

The weight ratio between the vanadium dioxide composite nano-particles and the dispersion medium in the vanadium dioxide composite nano-particle slurry may be 1:1-1:1000, preferably 1:10-1:100. The vanadium dioxide composite nano-particles prepared can be effectively dispersed in the dispersion medium at a weight percentage range of up to 50 wt. %, or up to 35 wt. %, or up to 20 wt. %, or up to 10 wt. % of the total weight of the vanadium dioxide composite nano-particles and the dispersion medium combined.

In addition, the vanadium dioxide composite nano-particle slurry may contain dispersion-assisting agents which may be one or more agents selected from the group consisting of polyacrylate, polyacrylamide, polyphosphate, polyvinyl alcohol, polyvinylpyrrolidone, and modified polyesters, modified polyurethanes, and modified acrylic acid dispersion agents.

With regard to preparing the vanadium dioxide powder slurry, specifically, 0.1-50 wt. % of resulting vanadium dioxide composite nano-particles and 40-99 wt. % of dispersion medium are mixed and stirred at high speed for pre-dispersion, and then dispersion-assisting agents are added to the mixture, and the resulting mixture is stirred at high speed to obtain an evenly mixed vanadium dioxide nano-particles slurry. Further, the slurry can be evenly mixed in a manner such as ultrasound, ball-milling, and/or sanding.

Alternatively, the vanadium dioxide nano-particle composition comprises a mixture of a polymer emulsion and the vanadium dioxide composite nano-particle slurry; wherein the polymer emulsion is an aqueous dispersion or an emulsion of polymer resin.

In a particular embodiment, the polymer emulsion is the emulsion of polymer resin; wherein the polymer resin is selected from one or more of polyurethane resins, polyurea resins, polyurethane/polyurea resins, ionomer resins, polyester resins, silicone resins or epoxy resins.

Additives such as wetting-assisting agents, coalescing agents, leveling agents, defoaming agents, and/or thickening agents may be added in an amount of 0.01-5 wt. % and the resulting mixture may be stirred at high speed until mixed.

It is envisioned that additives may be included in any or all of the polymer composition, the vanadium dioxide composite nano-particle slurry, or the mixture of the polymer emulsion and the vanadium dioxide composite nano-particle slurry.

Thus, the vanadium dioxide nano-particle composition may further comprise one or more additive such as antioxidants, initiators, processing aids, stabilizers, surfactants, impact modifiers, softening agents, plasticizers, coalescing agents, wetting-assisting agents, thickening agents, levelling agents, waxes, adhesion promoters, fillers, fibers, flakes, plasticizers, chemical blowing and foaming agents, defoaming agents, optical brighteners, coloring agents, fluorescent agents, whitening agents, UV absorbers, light stabilizers, fragrance components, titanium dioxide or nano-scale materials.

In one golf ball construction, a golf ball of the invention comprises a core, a cover and a coating layer; wherein the coating layer is the layer formed from the vanadium dioxide nano-particle composition. In one embodiment, the polymer composition of the vanadium dioxide nano-particle composition is a latex, a lacquer, or an enamel. In another such embodiment, the polymer composition of the vanadium dioxide nano-particle composition comprises an acrylic, an epoxy, a urethane, a polyester, a urethane acrylate, a polyester acrylate, or an alkyd.

In another golf ball construction, a golf ball of the invention comprises a core and a cover; wherein the cover is the layer formed from the vanadium dioxide nano-particle composition. In a particular embodiment, the polymer composition of the vanadium dioxide nano-particle composition is one or more of a thermoset polyurethane composition, a thermoplastic polyurethane composition, or an ionomer composition. In a specific embodiment, the vanadium dioxide nano-particle composition is castable.

In yet another golf ball construction, a golf ball of the invention golf comprises a core and a cover; wherein the core comprises the vanadium dioxide nano-particle composition. In a specific embodiment, the polymer composition is rubber-based.

In some embodiments, one or more vanadium dioxide nano-particle may form a core of a core-shell polymer; wherein a shell of the core-shell polymer comprises titanium dioxide. In this regard, it is envisioned that the vanadium dioxide nano-particle forming the core of the core-shell polymer may be a vanadium dioxide composite nano-particle as defined herein. Additionally, embodiments are envisioned wherein at least one conventional vanadium dioxide nano-particle forms the core of the core-shell polymer.

In a specific embodiment, the polymer composition is preferably included in the vanadium dioxide nano-particle composition in an amount of 30 wt. % or greater, based on the total weight of the vanadium dioxide nano-particle composition. In alternative embodiments, the polymer composition is included in the vanadium dioxide nano-particle composition in an amount of 40 wt. % or greater, based on the total weight of the vanadium dioxide nano-particle composition, or in an amount of 50-95 wt. %, or 50-85 wt. %, or 50-70 wt. %, based on the total weight of the vanadium dioxide nano-particle composition.

In other embodiments, the plurality of vanadium dioxide composite nano-particles are included in the vanadium dioxide nano-particle composition in an amount of from 1 to 50 parts by weight per 100 parts by weight of polymer composition, or from 1 to 40 parts by weight per 100 parts by weight of polymer composition, or from 1 to 30 parts by weight per 100 parts by weight of polymer composition, or from 1 to 20 parts by weight per 100 parts by weight of polymer composition, or from 1 to 10 parts by weight per 100 parts by weight of polymer composition, or from 5 to 10 parts by weight per 100 parts by weight of polymer composition, or from 5 to 15 parts by weight per 100 parts by weight of polymer composition, or from 10 to 15 parts by weight per 100 parts by weight of polymer composition, or from 10 to 20 parts by weight per 100 parts by weight of polymer composition, or from 20 to 50 parts by weight per 100 parts by weight of polymer composition, or from 5 to 35 parts by weight per 100 parts by weight of polymer composition, or from 5 to 25 parts by weight per 100 parts by weight of polymer composition, or from 5 to 45 parts by weight per 100 parts by weight of polymer composition.

In other embodiments, the solids content of the vanadium dioxide composite nano-particles in the vanadium dioxide nano-particle composition is 0.1-50%, or 3-30%, or 5-50%, or 5-30%, or 3-20%, or 2-15%, or 3-10%.

Meanwhile, in some embodiments, the polymer composition and the vanadium dioxide composite nano-particle slurry are included in the vanadium dioxide nano-particle composition in a wt. % ratio of from 80:20 to 30:70.

In other embodiments, the polymer composition and the mixture of the polymer emulsion and the vanadium dioxide composite nano-particle slurry are included in the vanadium dioxide nano-particle composition in a wt. % ratio of from 80:20 to 30:70.

In some embodiments, 20-80 wt. % of the polymer emulsion (based on the total weight of the mixture) is added to 10-60 wt. % of the vanadium dioxide composite nano-particle slurry (based on the total weight of the mixture).

In other embodiments, the polymer emulsion and vanadium dioxide composite nano-particle slurry may be combined in a wt. % ratio from 75:15 to 50:50, based on the total weight of the vanadium dioxide nano-particle composition. In specific such examples, the wt. % ratio is 70:20, or 60:30, or 40:30, or 45:45.

The invention also relates to a method of making a golf ball comprising the steps of: providing a subassembly; and forming one or more layers about the subassembly; wherein one or more of the subassembly or the one or more layers is formed from a vanadium dioxide nano-particle composition; wherein the vanadium dioxide nano-particle composition comprises one of a plurality of vanadium dioxide composite nano-particles; a vanadium dioxide composite nano-particle slurry; or a mixture of a polymer emulsion and the vanadium dioxide composite nano-particle slurry.

A layer formed from a vanadium dioxide nano-particle composition exhibits both high visible light transmittance and excellent ultraviolet light screening without sacrificing durability and other desirable playing characteristics. Advantageously, each layer formed from a vanadium dioxide nano-particle composition can be tailored to target desired golf ball physical and chemical properties. For example, a layer formed from the vanadium dioxide nano-particle composition can possess the strength and hardness sufficient to withstand and survive the great force and impact of a club face striking the golf ball and meanwhile may be sufficiently elastic to target desired CoR, spin and/or feel and/or performance characteristics such as flight trajectory and distance.

Golf balls of the present invention may have any known construction, so long as at least one layer or coating is formed from a vanadium dioxide nano-particle composition as disclosed herein. Golf balls of the invention may contain any number of other layers comprising any known composition and have any known dimensions and possess any known golf properties. Golf balls of the invention may have any known dimple count.

Thus, golf balls of the invention may have any known diameter; cores of golf ball of the invention may have any known diameter; and golf ball layer(s), including golf ball layer(s) formed from a vanadium dioxide nano-particle composition, may have any known thickness. Non-limiting examples of suitable core diameters range from less than 0.5 inches up to 1.8 inches or greater. Non-limiting examples of suitable coating layer thicknesses range from 0.1 mil to 35.0 mils, or from 0.1 mil to 15.0 mils, or from 0.1 mil to 10.0 mils, or from 0.1 mil to 5.0 mils, or from 0.1 mil to 3.0 mils. Non-limiting examples of suitable non-coating layer thicknesses range from 0.005 inches to 0.750 inches.

Logo(s) or other print such as UV print may be provided on any layer surface of a golf ball of the invention.

Furthermore, golf ball layers may be applied or molded using any known suitable process in view of the particular polymer composition selected for the given vanadium dioxide nano-particle composition, the pre-selected layer thickness, and/or the specific layer-type (inner core, intermediate layer, outer cover, coating layer) being formed from the vanadium dioxide nano-particle composition. For example, the golf ball layers, including a layer formed from vanadium dioxide nano-particle composition, may be formed using compression molding, flip molding, injection molding, retractable pin injection molding, reaction injection molding (RIM), liquid injection molding (LIM), casting, vacuum forming, particle coating, flow coating, spin coating, dipping, spraying, and the like. Conventionally, compression molding and injection molding are applied to thermoplastic materials, whereas RIM, liquid injection molding, and casting are employed on thermoset materials.

It is envisioned that a golf ball of the invention may include two or more layers, wherein each of at least two of the two or more layers is formed from the same vanadium dioxide nano-particle composition.

In other embodiments, a golf ball of the invention may include two or more layers, wherein each of at least two of the two or more layers is formed from a different vanadium dioxide nano-particle composition. For example, in one embodiment, a golf ball of the invention comprises a first layer and a second layer; wherein the first layer is formed from a first vanadium dioxide nano-particle composition and the second layer is formed from a second vanadium dioxide nano-particle composition; wherein the first vanadium dioxide nano-particle composition is different than the second vanadium dioxide nano-particle composition.

In one such embodiment, the first vanadium dioxide nano-particle composition comprises a first plurality of vanadium dioxide composite nano-particles and the second vanadium dioxide nano-particle composition comprises a second plurality of vanadium dioxide composite nano-particles; wherein the first plurality of vanadium dioxide composite nano-particles is different than the second plurality of vanadium dioxide composite nano-particles.

In this regard, two given pluralities of vanadium dioxide composite nano-particles may differ, for example, with respect to particle size, particle shape, number of particles, particle type, and/or specific nano-particle surface treatment.

In another embodiment, the first vanadium dioxide nano-particle composition comprises a plurality of vanadium dioxide composite nano-particles and the second vanadium dioxide nano-particle composition comprises a vanadium dioxide composite nano-particle slurry.

In yet another embodiment, the first vanadium dioxide nano-particle composition comprises a plurality of vanadium dioxide composite nano-particles and the second vanadium dioxide nano-particle composition comprises a mixture of a polymer emulsion and the vanadium dioxide composite nano-particle slurry.

In an alternative embodiment, the first vanadium dioxide nano-particle composition comprises a first vanadium dioxide composite nano-particle slurry and the second vanadium dioxide nano-particle composition comprises a second vanadium dioxide composite nano-particle slurry; wherein the first vanadium dioxide composite nano-particle slurry is different than the second vanadium dioxide composite nano-particle slurry.

In a different embodiment, the first vanadium dioxide nano-particle composition comprises a vanadium dioxide composite nano-particle slurry and the second vanadium dioxide nano-particle composition comprises a mixture of a polymer emulsion and the vanadium dioxide composite nano-particle slurry.

Meanwhile, an embodiment is also envisioned wherein the first vanadium dioxide nano-particle composition comprises a first mixture of a polymer emulsion and the vanadium dioxide composite nano-particle slurry and the second vanadium dioxide nano-particle composition comprises a second mixture of a polymer emulsion and the vanadium dioxide composite nano-particle slurry; wherein the first mixture of the polymer emulsion and the vanadium dioxide composite nano-particle slurry is different than the second mixture of the polymer emulsion and the vanadium dioxide composite nano-particle slurry.

In different embodiments, a golf ball of the invention comprises a first layer and a second layer; wherein the first layer is formed from a first vanadium dioxide nano-particle composition and the second layer is formed from a second vanadium dioxide nano-particle composition; wherein the first vanadium dioxide nano-particle composition comprises a first polymer composition and the second vanadium dioxide nano-particle composition comprises a second polymer composition; wherein the first polymer composition is different than the second polymer composition.

Two given polymer compositions may differ, for example, with respect to polymer type (e.g., latex, lacquer, enamel, acrylic, epoxy, urethane, polyester, urethane acrylate, polyester acrylate, alkyd, thermoset polyurethane composition, thermoplastic polyurethane composition, ionomer composition, etc.) or relative amounts of polymer composition included, or with respect to the type or amounts of additive(s) included in the respective polymer compositions of the respective layers to target layer properties.

It is also envisioned that the first vanadium dioxide nano-particle composition and the second vanadium dioxide nano-particle composition may differ with respect to both polymer composition and the vanadium dioxide composite nano-particle-containing portion of the vanadium dioxide nano-particle composition.

In some embodiments, two given differing layers of vanadium dioxide nano-particle composition may be adjacent. In other embodiments, a conventional layer may be disposed between two given differing inventive layers comprised of vanadium dioxide nano-particle composition.

In one embodiment, the first layer of the golf ball is a cover layer, while the second layer is a coating layer disposed about and adjacent to the cover layer.

In another embodiment, each of the first layer and second layer of the golf ball is a cover layer. For example, the first layer may be an inner cover layer while the second layer is an outer cover layer.

In yet another embodiment, the first layer may be a casing layer while the second layer is a cover layer.

In still another embodiment, each of the first layer and second layer of the golf ball in the examples above is a coating layer.

The vanadium dioxide composite nano-particle slurry is a flowable heterogeneous mixture of a plurality of vanadium dioxide composite nano-particles within a suitable liquid medium wherein the vanadium dioxide nano-particles are insoluble matter, do not dissolve, but become suspended throughout the bulk of the solvent, left floating around freely in the liquid medium when combined with the polymer composition or the polymer emulsion.

In turn, the polymer emulsion is a mixture of two or more suitable liquids in which one is present as droplets of microscopic or ultramicroscopic size and distributed throughout the other. The emulsion may be formed from component liquids either spontaneously or by mechanical means, such as agitation, provided that the liquids that are mixed have no (or a very limited) mutual solubility. Non-limiting examples include polyurethane emulsions and ionomeric emulsions.

Moreover, an emulsion of polymer resin is an emulsion wherein at least one surfactant in the emulsion is replaced with a resin. In this regard, a surfactant is an essential part of the mix when forming an emulsion. Surfactants are substances that reduce surface tension between two given liquids, due to surfactants being amphiphilic molecules having a hydrophobic part and a hydrophilic part.

When a surfactant is replaced with a resin, during polymerization, some of the resin grafts onto the backbone of the polymer, while the rest of the resin stays in the aqueous phase. Polymer growth and separation are controlled as with a surfactant, but additional attributes can be achieved by using the resin, versus being limited to the performance characteristics of the surfactant.

Meanwhile, an aqueous dispersion is a two-phase liquid system wherein one phase consists of finely divided particles that are uniformly dispersed/distributed throughout the second phase, which is water.

It is envisioned that the polymer composition may comprise any known composition such as but not limited to thermoset compositions, thermoplastic compositions, castable or non-castable polyurethane compositions, polyurea compositions, polyurethane/polyurea hybrid compositions, ionomer resins, rubber-based compositions, balata, plasticized thermoplastics, polyalkenamer compositions, polyester-based thermoplastic elastomers containing plasticizers, transparent or plasticized polyamides, thiolene compositions, poly-amide and anhydride-modified polyolefins, organic acid-modified polymers.

In one preferred embodiment, the polymer composition comprises an ionomer. Suitable ionomers include O/X, E/X, O/X/Y, and E/X/Y-type copolymers that are at least partially neutralized with one or more cation(s), optionally in the presence of an organic acid such as disclosed in U.S. Pat. No. 6,756,436, the entire disclosure of which is hereby incorporated herein by reference. Specifically, O is an α-olefin, E is ethylene, X is a $C_3$-$C_8$ α,β-ethylenically unsaturated carboxylic acid, and Y is a softening monomer.

The term, "copolymer," as used herein, includes polymers having two types of monomers, those having three types of monomers, and those having more than three types of monomers.

A partially neutralized ionomer has about 70 percent or less of acid groups present neutralized by at least one cation, while a highly neutralized polymer (HNP) has greater than about 70 percent of acid groups present neutralized by the cation(s), and embodiments are even envisioned wherein an excess amount of cation is included in addition to that sufficient to neutralized 100% of the acid groups present.

Suitable cations include, but are not limited to, metal ion sources, such as compounds of alkali metals, alkaline earth metals, transition metals, and rare earth elements; ammonium salts and monoamine salts; or combinations thereof. Preferred cations include for example compounds of magnesium, sodium, potassium, cesium, calcium, barium, manganese, copper, zinc, lead, tin, aluminum, nickel, chromium, lithium, rare earth metals, or combinations thereof.

The "O" is preferably selected from ethylene and propylene. Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like.

The acid copolymer can be reacted with the optional high molecular weight organic acid and the cation(s) simultaneously, or prior to the addition of the cation(s).

In some embodiments, X is preferably selected from methacrylic acid, acrylic acid, ethacrylic acid, crotonic acid, and itaconic acid. Methacrylic acid and acrylic acid are particularly preferred. In turn, Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Some preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. Some more preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

As used herein, "(meth) acrylic acid" means methacrylic acid and/or acrylic acid. Likewise, "(meth) acrylate" means methacrylate and/or acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ $\alpha,\beta$-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer.

"Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

Ionomers may encompass those polymers obtained by copolymerization of an acidic or basic monomer, such as alkyl (meth)acrylate, with at least one other comonomer, such as an olefin, styrene or vinyl acetate, followed by at least partial neutralization. Alternatively, acidic or basic groups may be incorporated into a polymer to form an ionomer by reacting the polymer, such as polystyrene or a polystyrene copolymer including a block copolymer of polystyrene, with a functionality reagent, such as a carboxylic acid or sulfonic acid, followed by at least partial neutralization. Suitable neutralizing sources include cations for negatively charged acidic groups and anions for positively charged basic groups.

Non-limiting examples of commercially available ionomers suitable for use with the present invention include for example SURLYNs® from DuPont and Ioteks® from Exxon. SURLYN® 8940 (Na), SURLYN® 9650 (Zn), and SURLYN® 9910 (Zn) are examples of low acid ionomer resins with the acid groups that have been neutralized to a certain degree with a cation. More examples of suitable low acid ionomers, e.g., Escor® 4000/7030 and Escor® 900/8000, are disclosed in U.S. Pat. Nos. 4,911,451 and 4,884,814, the disclosures of which are incorporated by reference herein. High acid ionomer resins include SURLYN® 8140 (Na) and SURLYN® 8546 (Li), which have an methacrylic acid content of about 19 percent. The acid groups of these high acid ionomer resins that have been neutralized to a certain degree with the designated cation.

In a particular embodiment, ionomers may be selected from DuPont® HPF ESX 367, HPF 1000, HPF 2000, HPF AD1035, HPF AD1035 Soft, HPF AD1040, and AD1172 ionomers, commercially available from E. I. du Pont de Nemours and Company.

Suitable HNPs include, but are not limited to, polymers containing $\alpha,\beta$-unsaturated carboxylic acid groups, or the salts thereof, that have been highly neutralized by organic fatty acids. Such HNPs are commercially available from DuPont under the trade name HPF, e.g., HPF 1000 and HPF 2000. The HNP can also be formed using an oxa-containing compound as a reactive processing aid to avoid processing problems, as disclosed in U.S. Patent Publication No. 2003/0225197. In particular, an HNP can include a thermoplastic resin component having an acid or ionic group, i.e., an acid polymer or partially neutralized polymer, combined with an oxa acid, an oxa salt, an oxa ester, or combination thereof and an inorganic metal compound or organic amine compound.

In addition, the HNP can be formed from an acid copolymer that is neutralized by one or more amine-based or ammonium-based components, or mixtures thereof, as disclosed in U.S. Pat. No. 7,160,954 entitled "Golf Ball Compositions Neutralized with Ammonium-Based and Amine-Based Compounds," which is incorporated in its entirety by reference herein.

An acid copolymer that is partially or highly neutralized in a manner described above may be subjected to additional neutralization using more traditional processes, e.g., neutralization with salts of organic fatty acids and/or a suitable cation(s).

Meanwhile, the polymer composition may comprise a thermoplastic or thermoset polyurethane composition. In general, polyurethanes contain urethane linkages formed by reacting an isocyanate group (—N═C═O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

By the term, "isocyanate compound" as used herein, it is meant any aliphatic or aromatic isocyanate containing two or more isocyanate functional groups. The isocyanate compounds can be monomers or monomeric units because they can be polymerized to produce polymeric isocyanates containing two or more monomeric isocyanate repeat units. The isocyanate compound may have any suitable backbone chain structure including saturated or unsaturated, and linear, branched, or cyclic. By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with amine-terminated component. By the term, "polyol" as used herein, it is meant any aliphatic or aromatic compound containing two or more hydroxyl functional groups. The term "polyol" may be used interchangeably with hydroxy-terminated component.

Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled.

Thermoplastic polyurethanes are therefore particularly desirable as an outer cover layer material. Non-limiting examples of suitable thermoplastic polyurethanes include TPUs sold under the tradenames of Texin® 250, Texin® 255, Texin® 260, Texin® 270, Texin® 950U, Texin® 970U, Texin® 1049, Texin® 990DP7-1191, Texin® DP7-1202, Texin® 990R, Texin® 993, Texin® DP7-1049, Texin® 3203, Texin® 4203, Texin® 4206, Texin® 4210, Texin® 4215, and Texin® 3215, each commercially available from Covestro LLC, Pittsburgh PA; Estane® 50 DT3, Estane® 58212, Estane® 55DT3, Estane® 58887, Estane® EZ14-23A, Estane® ETE 50DT3, each commercially available from Lubrizol Company of Cleveland, Ohio; and Elastollan® WY1149, Elastollan® 1154D53, Elastollan® 1180A, Elastollan® 1190A, Elastollan® 1195A, Elastollan® 1185AW, Elastollan® 1175AW, each commercially available from BASF; Desmopan® 453, commercially available from Bayer of Pittsburgh, PA, and the E-Series TPUs, such as D 60 E 4024 commercially available from Huntsman Polyurethanes of Germany.

On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Aromatic polyurethanes can be prepared in accordance with this invention and these materials are preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and cut/shear-resistance.

Aliphatic polyurethanes also can be prepared in accordance with this invention and these materials are preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. Particularly suitable multifunctional isocyanates include trimers of HDI or $H_{12}$ MDI, oligomers, or other derivatives thereof. The resulting polyurethane generally has good light and thermal stability.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG) which is particularly preferred, polyethylene propylene glycol, polyoxypropylene glycol, and mixtures thereof. The hydrocarbon chain can have saturated or unsaturated bonds and substituted or unsubstituted aromatic and cyclic groups.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

In one embodiment, the isocyanate compound is added to a reaction vessel and then a curative mixture comprising the polyol and curing agent is added to the reaction vessel. The components are mixed together so that the molar ratio of isocyanate groups to hydroxyl groups is preferably in the range of about 1.00:1.00 to about 1.10:1.00.

In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single chain-extender or blend of chain-extenders as known in the golf ball art. As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. In general, thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio.

A catalyst may be employed to promote the reaction between the isocyanate and polyol compounds for producing the prepolymer or between prepolymer and chain-extender during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 2,2'-(1,4-phenylenedioxy)diethanol, 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"); and mixtures thereof. One particularly suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

In addition, the polyurethane compositions may contain fillers, additives, and other ingredients that do not detract from the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives.

Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Rubber regrind (recycled core material) and polymeric, ceramic, metal, and glass microspheres also may be used. Generally, the additives will be present in the composition in an amount between about 1 and about 70 weight percent based on total weight of the composition depending upon the desired properties.

Additional examples of other suitable golf ball compositions, dimensions, golf properties methods for measuring properties of golf balls of the invention and methods for making golf balls of the invention are disclosed in the following co-owned patents/publications, each of which is hereby incorporated by reference herein in its entirety: U.S. Ser. No. 11/040,250, U.S. Pat. Nos. 10,933,285, 10,596,419, 10,016,659, 10,661,123, 10,967,225, 10,821,327, 10,252,113, 10,918,912, 10,814,180, 10,773,129, 10,682,553, 10,500,444, 10,500,443, 10,427,004, 10,119,008, 10,105,576, 10,105,575, 10,933,285, 10,933,285, 10,933,285, 10,933,285, 10,933,285, 9,095,748, 10,428,216 and U.S. Publ. No. 2021/0094209.

When incorporated in a coating layer, the vanadium dioxide nano-particle composition has sufficient hardness to withstand the great force and impact of a club face striking the golf ball. In this regard, ASTM D2134 and a Sward-type hardness rocker can be used to confirm that a coating layer formed from the vanadium dioxide nano-particle composition has a Sward-type hardness that is within a suitable range. Non-limiting examples of suitable Sward Rocker Hardness values include a Sward Rocker Hardness value of about 5 or greater, or a Sward Rocker Hardness value of about 10 or greater, or a Sward Rocker Hardness value of from about 30 to 80, or a Sward Rocker Hardness value of from about 40 to 70, or a Sward Rocker Hardness value of from about 45 to 60, or a Sward Rocker Hardness value of less than about 40, or a Sward Rocker Hardness value of less than about 35, or a Sward Rocker Hardness value of at least 40, and/or a Sward Rocker Hardness value of at least 45.

Additionally, ASTM D3363 can be used to confirm that a coating layer formed from the vanadium dioxide nano-particle composition has sufficient pencil hardness. An inventive coating layer formed from vanadium dioxide nano-particle composition may have a pencil hardness, for example, in excess of 3H on the scale, a pencil hardness rating of from about 3H to about 7H on the scale, a pencil hardness of HB on the scale, a pencil hardness of less than about HB on the scale, a pencil hardness of B on the scale, or a pencil hardness of 2 B.

Meanwhile, in some embodiments, the moisture barrier properties of a layer formed from a vanadium dioxide nano-particle composition may be targeted. In such embodiments, these moisture barrier properties may be confirmed by ascertaining the normalized moisture vapor transition rate (nMVTR) thereof. Normalized MVTRs compare the ability of materials to resist moisture penetration irrespective of the thickness of the material and can be determined by the equation VTR(g·mm/m$^2$·day)·(1/thickness (mm)) or g/(m$^2$·day). Non-limiting examples of suitable nMVTRs include an nMVTR of less than about 5.0, an nMVTR in the range of 3.9 to 6.3, an nMVTR in the range of less than 9.0, and/or or an nMVTR of from 9.0 to 12.0.

Moreover, the flexural modulus of a vanadium dioxide nano-particle composition may be tailored and confirmed using ASTM D790. In some embodiments, the vanadium dioxide nano-particle composition may have a relatively low modulus with a lower limit of 1,000 or 5,000 or 10,000 or 15,000 or 20,000 or 25,000 or 30,000 psi and an upper limit of 40,000 or 45,000 or 50,000 or 60,000 or 70,000 or 80,000. The hardness of the low modulus material is generally 30 Shore D or greater; or 40 Shore D or greater; or 50 Shore D or greater, or preferably within a range having a lower limit of 30 or 40 or 50 Shore D and an upper limit of 60 or 70 or 80 or 85 Shore D.

Alternatively, the vanadium dioxide nano-particle composition may be tailored to have a relatively high modulus within the range having a lower limit of 90,000 or 100,000 or 110,000 or 120,000 or 130,000 or 140,000 or 150,000 psi and an upper limit of 200,000 or 300,000 or 400,000 or 500,000 or greater and a hardness of 40 Shore D or greater, or 50 Shore D or greater, or 60 Shore D or greater, or within a range having a lower limit of 40 or 50 or 60 Shore D and an upper limit of 80 or 90 or 100 Shore D.

Meanwhile, the vanadium dioxide nano-particle composition may also be tailored to have a suitable tensile strength. Non-limiting examples of suitable vanadium dioxide nano-particle composition tensile strengths include at least 500 psi, at least 1,000 psi, at least 2,000 psi, at least 5,000 psi, at least 6,000 psi, at least 7,000 psi, at least 8,000 psi, or at least 10,000 psi. Tensile Strength (psi) may be measured using ASTM D638.

The vanadium dioxide nano-particle composition may also be tailored to have a suitable elongation at break. Non-limiting examples of suitable vanadium dioxide nano-particle composition elongation at breaks include 10% to 200%, about 20 to 1000%, at least 25%, or at least about 50%, or at least 100%, or 200% or greater, or 300% or greater, or at least about 400% to about 800%. Elongation at break (%) may be measured using ASTM D638.

Furthermore, the vanadium dioxide nano-particle composition may be tailored to have a suitable Izod impact strength. Non-limiting examples of suitable vanadium dioxide nano-particle composition Izod impact strengths include greater than 0.90 ft.lb./in., at least 1.0 ft.lb./in., greater than 1.0 ft.lb./in., or at least 2.0 ft.lb./in. Izod impact strength may be measured using Izod Impact Test (ft.lb./in.) ASTM D256.

Layers of golf balls of the invention other than coating layers may have various hardnesses and hardness gradients as known in the golf ball art depending on the particular golf ball playing characteristics being targeted. Non-limiting examples of suitable hardness ranges include from 35 Shore C to about 98 Shore C, or 50 Shore C to about 90 Shore C, or 60 Shore C to about 85 Shore C, or 45 Shore C to about 75 Shore C, or 40 Shore C to about 85 Shore C, or from about 20 Shore D to about 90 Shore D, or from about 30 Shore D to about 60 Shore D, or from about 40 Shore D to about 50 Shore D, or 50 Shore D or less, or greater than 50 Shore D.

Of course, advantageously, a resulting golf ball of the invention created using the method of the invention may have any known hardness gradient and in any known hardness scale in the golf ball art such as Shore C, Shore D, Shore M, etc.

Thermoset and thermoplastic layers herein may be treated in such a manner as to create a positive or negative hardness gradient within and between golf ball layers. In golf ball layers of the present invention wherein a thermosetting rubber is used, gradient-producing processes and/or gradient-producing rubber formulation may be employed. Gradient-producing processes and formulations are disclosed more fully, for example, in U.S. Pat. Nos. 7,678,312; 7,537,530; 7,537,529; 7,429,221; and 7,410,429; the entire disclosures of which are hereby incorporated herein by reference.

Golf balls of the invention and the materials of layers thereof may have a Coefficient of Restitution (CoR) of at least 0.700, or 0.750 or greater, or at least 0.800. CoR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The CoR is then calculated as the ratio of the ball's outgoing transit time period to the ball's incoming transit time period ($COR=V_{out}/V_{in}=T_{in}/T_{out}$).

The durability and properties of the resulting golf ball of the invention and inventive layer thereof formed from a vanadium dioxide nano-particle composition can be evaluated using test methods such as but not limited to the following.

Dual Pendulum Durability

At least twelve golf balls are struck 200 times using a Titleist-made Rotating Pendulum Testing Machine. The machine is configured to strike/hit golf balls repeatedly with a grooved-metal face-plate, rotating at 1100 rpm, that is positioned 13.5 inches from the drive motor and angled at approximately 13 degrees. An assessment of failure is made every 50 hits using a black light to monitor when/if the coating failure began to occur.

After the golf balls are hit 200 times, each golf ball is then evaluated for crazing of the outermost coating layer (cracks or lines that appear in the coating once dried) via Graphite Rub Test by rubbing pencil graphite shavings on the surface of the golf ball and then observation is made as to evidence of cracks/spider webbing occurring on the golf ball.

In this regard, crazing occurs/results if the top layer of the coating dries faster than the underlying layer, which is therefore still wet.

The top layer of coating forms a skin as it hardens and continues to stretch, and when it hardens too fast, the skin can break, leaving cracks, ridges, bumps, holes and tears that produce unwanted textures in the coating.

Golf balls having a coating layer formed from a vanadium dioxide nano-particle composition according to the present invention preferably do not exhibit cracks/spider webbing, ridges, bumps, holes or tears.

Cold Crack

Golf balls are conditioned at −5° F. in a refrigerator, followed by hitting the golf balls on a CoR machine once a day for 5 days @125 ft/sec. and then inspected for coating cracking.

Golf balls having a coating layer formed from a vanadium dioxide nano-particle composition according to the present invention preferably do not exhibit coating cracking under the cold crack test.

Water Immersion Test

Golf balls are immersed in weight 1800-2000 g of water contained within paint cans, noting the date/time that the golf balls were immersed in the paint cans.

Following 5 days of immersion, the golf balls are removed from the paint cans and observed for coating blisters/peeling/other changes.

Golf balls having a coating layer formed from a vanadium dioxide nano-particle composition according to the present invention preferably do not exhibit coating blisters, peeling, or other changes under the water immersion test.

Fertilizer Immersion Test

Fertilizer is combined with water at 200 g. of fertilizer per 2000 g of water in paint cans. Golf balls are immersed in the paint cans for 5 days, noting the date/time of immersion.

The golf balls are then removed from the paint cans and inspected for coating blisters/peeling under black light to observe changes.

Golf balls having a coating layer formed from a vanadium dioxide nano-particle composition according to the present invention preferably do not exhibit blisters/peeling/under black light.

Oven Aging

Golf balls are placed in an oven and heated at 150° F. for 16 hours, followed by inspecting the golf balls under black light for defects.

Golf balls having a coating layer formed from a vanadium dioxide nano-particle composition according to the present invention preferably do not exhibit defects under the oven aging test.

Delamination

Golf balls are tested for delamination in order to demonstrate golf ball durability. As used herein, "delamination" refers to a condition wherein the cover exhibits stratification of the cover material into layers within the cover layer itself and these various layers "onion-skin" or peel off. Such delamination can typically be observed visually and can be confirmed through a simple manual test wherein a knife blade is used to "peel" the cover, exposing the stratification of the cover material. Layer separation may be visually apparent as "bubbling" or air pockets between the two layers. Delamination detrimentally affects not only the appearance of the golf ball but playability as well.

Golf balls having a cover or other non-coating layer formed from a vanadium dioxide nano-particle composition according to the present invention preferably do not exhibit delamination.

Peel Test

The peel strength from cover layer to adjacent casing layer is evaluated by performing the Peel Test. In particular, a strip of approximately ½ inch is cut around an equator of the golf ball, deep enough to cut through the entire layer to be tested. Next, a perpendicular cut is made across the strip and one end of the strip peeled back just enough to make a tab of about ½ inch. The ball is then clamped into a jig by poles with the tab facing upward. The jig allows the clamped ball to freely rotate about an axis parallel to the poles. The tab is then clamped to a 20 lb. load cell of a universal testing machine. The tab is pulled away from the ball at a rate of 0.5 in./min., and the force required to pull the outer layer off of the underlying layer is recorded.

Golf balls having a cover or other non-coating layer formed from a vanadium dioxide nano-particle composition according to the present invention preferably exhibit a peel strength of at least 15 lbs./in.

For each embodiment of a golf ball and/or method of the invention disclosed herein, alternative embodiments are indeed also envisioned wherein "comprises" (e.g., "comprise", "comprised of", "comprising", etc.) may be replaced with "consists essentially of" (e.g., "consist essentially of", "consisting essentially of", etc.) and/or "consists of" (e.g., "consist of", "consisting of", etc.).

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A golf ball comprising a first layer and an adjacent second layer, wherein the first layer is formed from a polymer composition comprising a plurality of vanadium dioxide composite nano-particles, wherein each vanadium dioxide composite nano-particle has a chemical composition of $V_{1-x}M_xO_2$, where M is any one or a combination of elements selected from Sc, Ti, Cr, Mn, Fe, Co, Ni, Cu, Zn, Sn, In, Sb, Ga, Ge, Pb and Bi, and $0 \leq x \leq 0.5$, and a surface that is grafted with organic modifying long-chain molecules having a length of from 0.1 nm to 100 nm, and wherein the first layer covers an entire surface of the adjacent second layer.

2. The golf ball of claim 1, wherein the polymer composition further comprises one or more additive selected from antioxidants, initiators, processing aids, stabilizers, surfactants, impact modifiers, softening agents, plasticizers, coalescing agents, wetting-assisting agents, thickening agents, levelling agents, waxes, adhesion promoters, fillers, fibers, flakes, plasticizers, chemical blowing and foaming agents, defoaming agents, optical brighteners, coloring agents, fluorescent agents, whitening agents, UV absorbers, light stabilizers, fragrance components, titanium dioxide or nano-scale materials.

3. The golf ball of claim 1, wherein each vanadium dioxide composite nano-particle has a particle size of 200 nm or less.

\* \* \* \* \*